United States Patent
Hoffman et al.

(10) Patent No.: US 8,784,258 B2
(45) Date of Patent: Jul. 22, 2014

(54) PLANETARY POWER TRANSMISSION

(75) Inventors: Donald Edward Hoffman, Canton, MI (US); David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 603 days.

(21) Appl. No.: 12/957,868

(22) Filed: Dec. 1, 2010

(65) Prior Publication Data

US 2012/0142485 A1  Jun. 7, 2012

(51) Int. Cl.
*F16H 3/44* (2006.01)

(52) U.S. Cl.
USPC .......................... 475/278; 475/292; 475/324

(58) Field of Classification Search
USPC .......................... 475/292, 289, 277, 278, 324
See application file for complete search history.

(56) References Cited

U.S. PATENT DOCUMENTS

| | | | |
|---|---|---|---|
| 3,722,301 A * | 3/1973 | Crooks ......................... | 74/15.63 |
| 3,747,727 A | 7/1973 | Dach et al. | |
| 5,106,352 A | 4/1992 | Lepelletier | |
| 6,752,738 B1 | 6/2004 | Martin et al. | |
| 6,860,831 B2 | 3/2005 | Ziemer | |
| 6,908,408 B2 | 6/2005 | Nielson | |
| 6,960,150 B2 | 11/2005 | Armstrong et al. | |
| 6,991,578 B2 * | 1/2006 | Ziemer ......................... | 475/296 |
| 7,125,360 B2 * | 10/2006 | Ziemer ......................... | 475/284 |
| 7,156,767 B2 | 1/2007 | Tiesler et al. | |
| 7,294,089 B2 | 11/2007 | Thomas et al. | |
| 7,377,873 B2 * | 5/2008 | Shim et al. ..................... | 475/284 |
| 7,470,208 B2 * | 12/2008 | Tiesler et al. ................. | 475/278 |
| 7,699,744 B2 | 4/2010 | Lepelletier | |
| 7,731,625 B2 | 6/2010 | Phillips et al. | |
| 7,736,259 B2 | 6/2010 | Wittkopp et al. | |
| 7,736,264 B2 | 6/2010 | Moorman et al. | |
| 7,766,785 B2 | 8/2010 | Thomas et al. | |
| 7,854,677 B2 * | 12/2010 | Choi ............................. | 475/275 |
| 7,867,131 B2 * | 1/2011 | Hart et al. ...................... | 475/284 |
| 8,016,714 B2 * | 9/2011 | Hoffman et al. .............. | 475/284 |
| 2007/0060438 A1 | 3/2007 | Fukuyama et al. | |
| 2008/0182704 A1 | 7/2008 | Thomas et al. | |
| 2010/0035718 A1 | 2/2010 | Saitoh | |
| 2010/0044141 A1 | 2/2010 | Kimes et al. | |
| 2010/0048346 A1 | 2/2010 | Hoffman et al. | |
| 2010/0144486 A1 | 6/2010 | Hart et al. | |
| 2010/0179016 A1 | 7/2010 | Hart et al. | |
| 2010/0179021 A1 | 7/2010 | Wittkopp et al. | |
| 2010/0190601 A1 | 7/2010 | Phillips | |

FOREIGN PATENT DOCUMENTS

JP     2002-323098     11/2002

* cited by examiner

*Primary Examiner* — David D Le
*Assistant Examiner* — Terry Chau
(74) *Attorney, Agent, or Firm* — James Dottavio; Brooks Kushman P.C.

(57) ABSTRACT

A multiple speed power transmission comprises: an epicyclic gearing assembly comprising first, second, third, and fourth rotating members with linearly related speeds; a double pinion planetary gear set with grounded carrier and input driven sun gear; two brakes; four clutches; and specified interconnections. The brakes and clutches are operated in combinations of two to produce eight forward speed ratios and at least one reverse speed ratio.

7 Claims, 9 Drawing Sheets

| Gear Number | Description | Number of teeth |
|---|---|---|
| 22 | Rear sun gear | 46 |
| 24 | Rear ring gear | 90 |
| 28 | Rear planet gear | 22 |
| 32 | Middle sun gear | 41 |
| 34 | Middle ring gear | 91 |
| 38 | Middle planet gear | 25 |
| 42 | Front sun gear | 54 |
| 44 | Front ring gear | 110 |
| 48 | Front inner planet gear | 25 |
| 50 | Front outer planet gear | 26 |

Fig. 2

| Gear | Brake 58 | Clutch 64 | Clutch 70 | Clutch 76 | Clutch 82 | Brake 86 / OWC 92 | Speed Ratio | Step Size |
|---|---|---|---|---|---|---|---|---|
| Rev |  | X |  |  |  | X | -3.986 | 83% |
| 1st |  |  | X |  |  | X | 4.751 |  |
|  |  |  |  |  |  |  |  | 1.608 |
| 2nd | X |  | X |  |  |  | 2.955 |  |
|  |  |  |  |  |  |  |  | 1.451 |
| 3rd |  | X | X |  |  |  | 2.037 |  |
|  |  |  |  |  |  |  |  | 1.322 |
| 4th |  |  | X | X |  |  | 1.541 |  |
|  |  |  |  |  |  |  |  | 1.204 |
| 5th |  |  | X |  | X |  | 1.279 |  |
|  |  |  |  |  |  |  |  | 1.279 |
| 6th |  |  |  | X | X |  | 1.000 |  |
|  |  |  |  |  |  |  |  | 1.260 |
| 7th |  | X |  |  | X |  | 0.794 |  |
|  |  |  |  |  |  |  |  | 1.199 |
| 8th | X |  |  |  | X |  | 0.662 |  |

Fig. 3

| Gear Number | Description | Number of teeth |
|---|---|---|
| 122 | Rear sun gear | 44 |
| 124 | Rear ring gear | 85 |
| 128 | Rear planet gear | 21 |
| 132 | Middle sun gear | 70 |
| 134 | Middle ring gear | 96 |
| 138 | Middle planet gear | 13 |
| 42 | Front sun gear | 33 |
| 44 | Front ring gear | 69 |
| 48 | Front inner planet gear | 14 |
| 50 | Front outer planet gear | 14 |

Fig. 5

| Gear | Brake 58 | Clutch 64 | Clutch 70 | Clutch 76 | Clutch 82 | Brake 86 / OWC 92 | Speed Ratio | Step Size |
|---|---|---|---|---|---|---|---|---|
| Rev |  | X |  |  |  | X | -4.039 | 81% |
| 1st |  |  | X |  |  | X | 4.958 |  |
|  |  |  |  |  |  |  |  | 1.616 |
| 2nd | X |  | X |  |  |  | 3.069 |  |
|  |  |  |  |  |  |  |  | 1.468 |
| 3rd |  | X | X |  |  |  | 2.091 |  |
|  |  |  |  |  |  |  |  | 1.348 |
| 4th |  |  | X | X |  |  | 1.552 |  |
|  |  |  |  |  |  |  |  | 1.210 |
| 5th |  |  | X |  | X |  | 1.282 |  |
|  |  |  |  |  |  |  |  | 1.282 |
| 6th |  |  |  | X | X |  | 1.000 |  |
|  |  |  |  |  |  |  |  | 1.270 |
| 7th |  | X |  |  | X |  | 0.787 |  |
|  |  |  |  |  |  |  |  | 1.195 |
| 8th | X |  |  |  | X |  | 0.659 |  |

Fig. 6

| Gear Number | Description | Number of teeth |
|---|---|---|
| 142 | Rear sun gear | 44 |
| 144 | Middle sun gear | 37 |
| 146 | Rear ring gear | 85 |
| 150 | Rear inner planet gear | 22 |
| 152 | Rear outer planet gear | 21 |
| 42 | Front sun gear | 33 |
| 44 | Front ring gear | 69 |
| 48 | Front inner planet gear | 14 |
| 50 | Front outer planet gear | 14 |

Fig. 8

| Gear | Brake 58 | Clutch 64 | Clutch 70 | Clutch 76 | Clutch 82 | Brake 86 / OWC 92 | Speed Ratio | Step Size |
|---|---|---|---|---|---|---|---|---|
| Rev |  | X |  |  |  | X | -4.039 | 84% |
| 1st |  |  | X |  |  | X | 4.803 |  |
|  |  |  |  |  |  |  |  | 1.593 |
| 2nd | X |  | X |  |  |  | 3.016 |  |
|  |  |  |  |  |  |  |  | 1.443 |
| 3rd |  | X | X |  |  |  | 2.091 |  |
|  |  |  |  |  |  |  |  | 1.335 |
| 4th |  |  | X | X |  |  | 1.567 |  |
|  |  |  |  |  |  |  |  | 1.211 |
| 5th |  |  | X |  | X |  | 1.294 |  |
|  |  |  |  |  |  |  |  | 1.294 |
| 6th |  |  |  | X | X |  | 1.000 |  |
|  |  |  |  |  |  |  |  | 1.270 |
| 7th |  | X |  |  | X |  | 0.787 |  |
|  |  |  |  |  |  |  |  | 1.195 |
| 8th | X |  |  |  | X |  | 0.659 |  |

Fig. 9

PLANETARY POWER TRANSMISSION

BACKGROUND OF THE INVENTION

This invention relates to automatic vehicular transmissions utilizing planetary gear sets and controllable clutches to obtain a suitable set of speed ratios.

In a front wheel drive vehicle, the axial space available for the transmission is limited by the width of the engine compartment and the length of the engine. In addition, the trend to increase the number of ratios available generally increases the number of components required. For these reasons, it is desirable to position components concentrically with each other in order to minimize axial length. The ability to position components concentrically is limited, however, by the need to connect particular components to each other and to the transmission case.

Furthermore, it is desirable for the output element to be located near the center of the vehicle, which corresponds to the input end of the gear box. An output element located toward the outside of the vehicle may require additional support structure and add length on the transfer axis. With some kinematic arrangements, however, the need to connect certain elements to the transmission case requires that the output element be so located.

BRIEF SUMMARY OF THE INVENTION

The claimed invention is a family of six and eight speed kinematic arrangements that are amenable to coaxial placement of components and also amenable to placing the output shaft near the front of the transmission. The arrangements include an epicyclic gearing assembly with four elements, a front planetary gear set with a stationary carrier, and a set of clutches and brakes. These arrangements are in the family of dual input kinematic arrangements as described in U.S. Pat. Nos. 5,106,352 and 7,699,744. One of the brakes is located internally and operates by releasably connecting one element of the epicyclic gearing assembly to the fixed carrier of the front gear set. As a result of this placement, this brake and two of the clutches may be positioned co-axially with each other and also with the epicyclic gearing assembly. Furthermore, this placement does not interfere with locating the output member at the front of the gear box. The epicyclic gearing assembly may take a number of forms, some of which would not be possible with a traditional placement of the aforementioned brake.

BRIEF DESCRIPTION OF THE DRAWINGS

FIG. 2 is a table showing the proposed tooth numbers for the gears of the transmission illustrated in FIG. 1.

FIG. 3 is a table indicating the clutch state and resulting speed ratio of the transmission in FIG. 1 when the gears have the numbers of teeth indicated in FIG. 2.

FIG. 5 is a table showing the proposed tooth numbers for the gears of the transmission illustrated in FIG. 4.

FIG. 6 is a table indicating the clutch state and resulting speed ratio of the transmission in FIG. 4 when the gears have the numbers of teeth indicated in FIG. 5.

FIG. 8 is a table showing the proposed tooth numbers for the gears of the transmission illustrated in FIG. 7.

FIG. 9 is a table indicating the clutch state and resulting speed ratio of the transmission in FIG. 7 when the gears have the numbers of teeth indicated in FIG. 8.

DETAILED DESCRIPTION OF THE INVENTION

Figure 1:
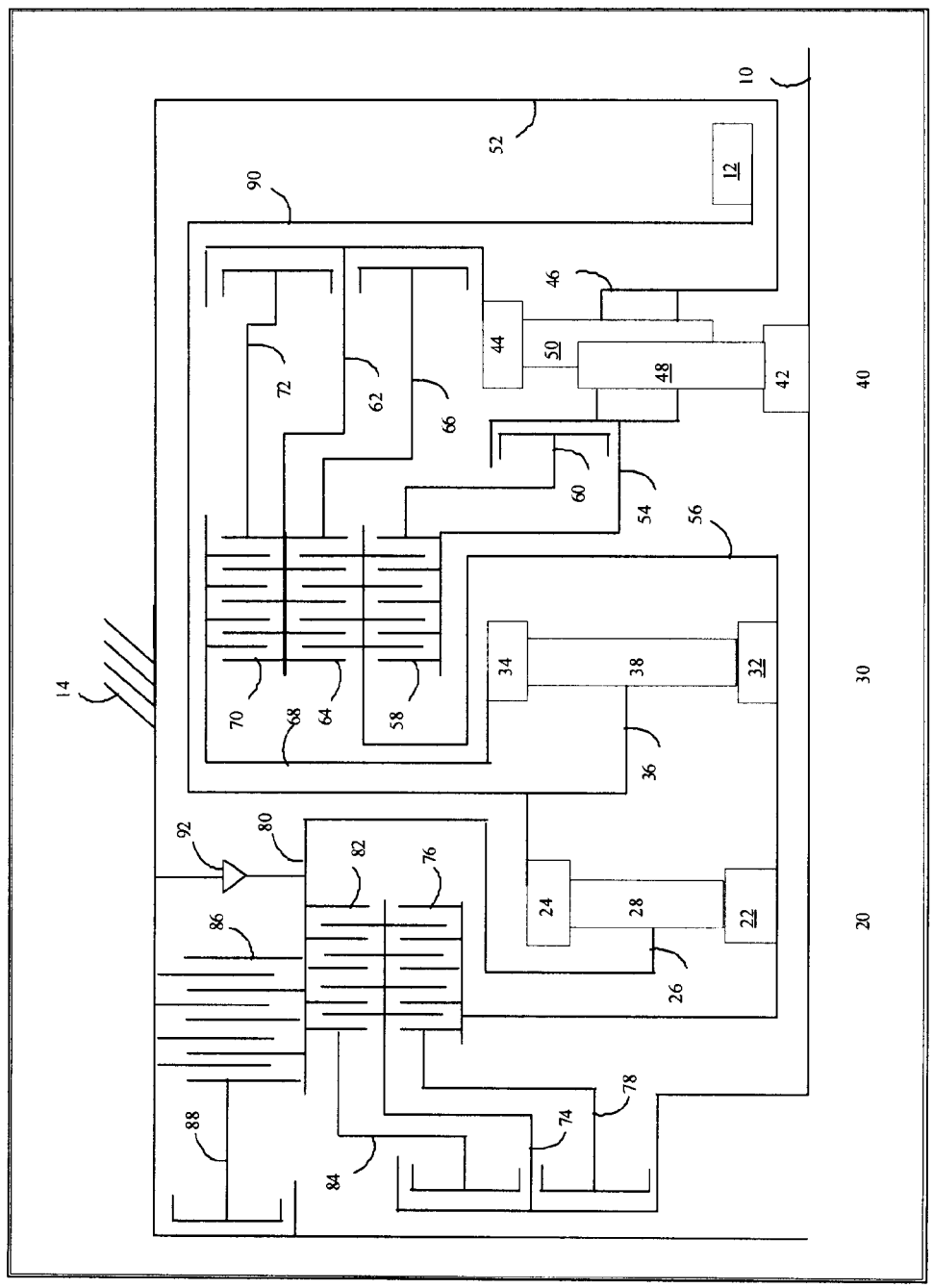
FIG. 1 is a schematic diagram of a transmission according to the present invention wherein the epicyclic gearing assembly is a Simpson gear set.

A transmission according to a first embodiment of the invention is illustrated in FIG. 1. A transmission housing 14 is fixed to the vehicle structure. An input shaft 10 is driven by the vehicle's engine, preferably via a launch device such as a torque converter with a lockup clutch, or via a dedicated launch clutch. Alternatively, the input shaft may be driven directly by the vehicle's engine. An output element 12 is driveably connected to the vehicle's wheels, preferably via a differential and either a set of transfer gears or a transfer chain. Output element 12 is supported by front support 52 which is fixed to the transmission housing.

Front gear set 40 is a double pinion planetary gear set. Carrier 46 is fixed to the front support 52. Sun gear 42 is fixed to input shaft 10. A set of inner planet gears 48 is supported for rotation on carrier 46 and meshes with sun gear 42. A set of outer planet gears 50 is also supported for rotation on carrier 46 such that each outer planet gear meshes with a corresponding inner planet gear 48. A ring gear 44 with internal teeth meshes with each of the outer planet gears 50. As a result of this gearing, ring gear 44 rotates in the same direction as input shaft 10 but at a reduced speed.

Rear gear set 20 and middle gear set 30 are simple planetary gear sets. A set of planet gears 28 is supported for rotation on carrier 26 and meshes with both sun gear 22 and ring gear 24. Similarly, a set of planet gears 38 is supported for rotation on carrier 36 and meshes with both sun gear 32 and ring gear 34. Sun gear 22 and sun gear 32 are fixed to each other and to shell 56. Carrier 26 is fixed to shell 80. Carrier 36 and ring gear 24 are fixed to each other and to output element 12 through shell 90. Ring gear 34 is fixed to shell 68.

Front cylinder assembly 62 is fixed to ring gear 44. Clutch pack 70 is comprised of plates splined to cylinder assembly 62 alternating with plates splined to shell 68. When hydraulic pressure is applied to piston 72, the plates are forced together and torque is transferred between ring gear 44 and ring gear 34. When the hydraulic pressure is released, ring gear 44 and ring gear 34 may rotate at different speeds with low parasitic drag. Similarly, clutch pack 64 is comprised of plates splined to cylinder assembly 62 alternating with plates splined to shell 56. When hydraulic pressure is applied to piston 66, torque is transferred between ring gear 44 and sun gears 22 and 32. Pressurized fluid is routed from the control body, through front support 52, into front cylinder assembly 62 between rotating seals.

Middle cylinder assembly 54 is fixed to carrier 46. Clutch pack 58 is comprised of plates splined to cylinder assembly 54 alternating with plates splined to shell 56. When hydraulic pressure is applied to piston 60, sun gear 22 and sun gear 32 are held against rotation. Pressurized fluid is routed from the control body, through front support 52, between planet gears, into middle cylinder assembly 54. A more traditional placement of this brake would preclude routing shell 90 to the front of the gear box and therefore require that the output be located near the center of the gear box. As a result of this placement of clutch pack 58, output element 12 is located in the more favorable position near the front of the gear box.

Rear cylinder assembly 74 is fixed to input shaft 10. When hydraulic pressure is applied to piston 84, clutch pack 82 transfers torque between input shaft 10 and carrier 26. Similarly, when hydraulic pressure is applied to piston 78, clutch pack 76 transfers torque between input shaft 10 and sun gears 22 and 32. Clutch pack 76 and piston 78 are required for an eight speed transmission, but may be omitted in a six speed transmission. Pressurized fluid is routed from the control body, through housing 14, into rear cylinder assembly 74 between rotating seals.

When hydraulic pressure is applied to piston 88, clutch pack 86 holds carrier 26 against rotation. One way clutch 92 passively prevents carrier 26 from rotating in the negative direction, but allows carrier 26 to rotate in the forward direction. One way clutch 92 may optionally be omitted and its function performed by actively controlling clutch 86.

This arrangement permits clutch packs 58, 64, and 70 to be positioned concentrically and outside of the planetary gear sets such that they do not add to the axial length of the gearbox. Similarly, clutch packs 76, 82, and 86 may be positioned concentrically with each other and outside the planetary gearing.

Although clutches 64, 70, 76, and 82 and brakes 58 and 86 have all been illustrated and described as hydraulically actuated multi-plate clutches or brakes, the invention may be practiced with alternate types of releasable connections including but not limited to dog clutches, controllable one way clutches, magnetically actuated clutches, or electrically actuated clutches. Components being fixed to one another means that the components are attached in a fashion that transfers torque and forces the components to rotate at the same speed for anticipated torque levels. Acceptable methods of fixing components to one another include but are not limited to machining from common stock, welds, spline joints, and interference fits. Some lash or torsional compliance between fixed components is permissible.

If the transmission of FIG. 1 is equipped with a launch device, then it is prepared for forward vehicle motion by engaging clutch 70. If one way clutch 92 is omitted, then brake 86 must also be engaged. If the launch device is a torque converter, the vehicle will accelerate as soon as the brakes are released. The torque converter lock up clutch should be engaged soon after the vehicle attains a sufficient speed. On the other hand, if the launch device is a dedicated launch clutch, forward motion is effectuated by gradually engaging the dedicated launch clutch.

If input shaft 10 is directly driven by the engine, then the only preparation required for forward vehicle motion is engaging brake 86 if one way clutch 92 is omitted. Forward motion is effectuated by gradually engaging clutch 70. The remaining steps in operating the transmission are independent of the type of launch device.

Once the vehicle reaches a sufficient forward speed, a shift into second gear is accomplished by gradually engaging brake 58. As brake 58 is engaged, one way clutch 92 will over run. If one way clutch 92 is omitted, brake 86 must be gradually released while brake 58 is engaged. All remaining shifts between adjacent gears are accomplished by the coordinated engagement of one clutch or brake and release of another clutch or brake while maintaining a third clutch or brake according to the table in FIG. 3. In addition to these shifts, all two step shifts may be accomplished by releasing a single element, engaging another element, and maintaining one element in an engaged state.

If the transmission is equipped with a launch device, then it is prepared for reverse vehicle motion by engaging clutch 64 and brake 86. As with forward motion, if the launch device is a torque converter, the vehicle will accelerate as soon as the brakes are released. If the launch device is a dedicated launch clutch, reverse motion is effectuated by gradually engaging the dedicated launch clutch. On the other hand, if input shaft 10 is directly driven by the engine, then the transmission is prepared for reverse vehicle motion by engaging brake 86 and reverse motion is effectuated by gradually engaging clutch 64.

A transmission according to this invention comprises an epicyclic gearing assembly with four members that rotate around a common axis with speeds that are linearly related. Specifically, the second and third elements each have speeds that are a weighted average of the speed of the first and fourth elements. The speed of the second element is between the speed of the first and third elements. The speed of the third element is between the speed of the second and fourth elements. The weighting factors are determined by the configuration of the epicyclic gearing assembly and the ratios of the numbers of gear teeth.

In the transmission of FIG. 1, the epicyclic gearing assembly corresponds to planetary gear sets 20 and 30. The first member corresponds to ring gear 34. The second member corresponds to the combination of carrier 36 and ring gear 24. The third member corresponds to carrier 26. Finally, the fourth member corresponds to the combination of sun gear 22 and sun gear 32.

Figure 4:
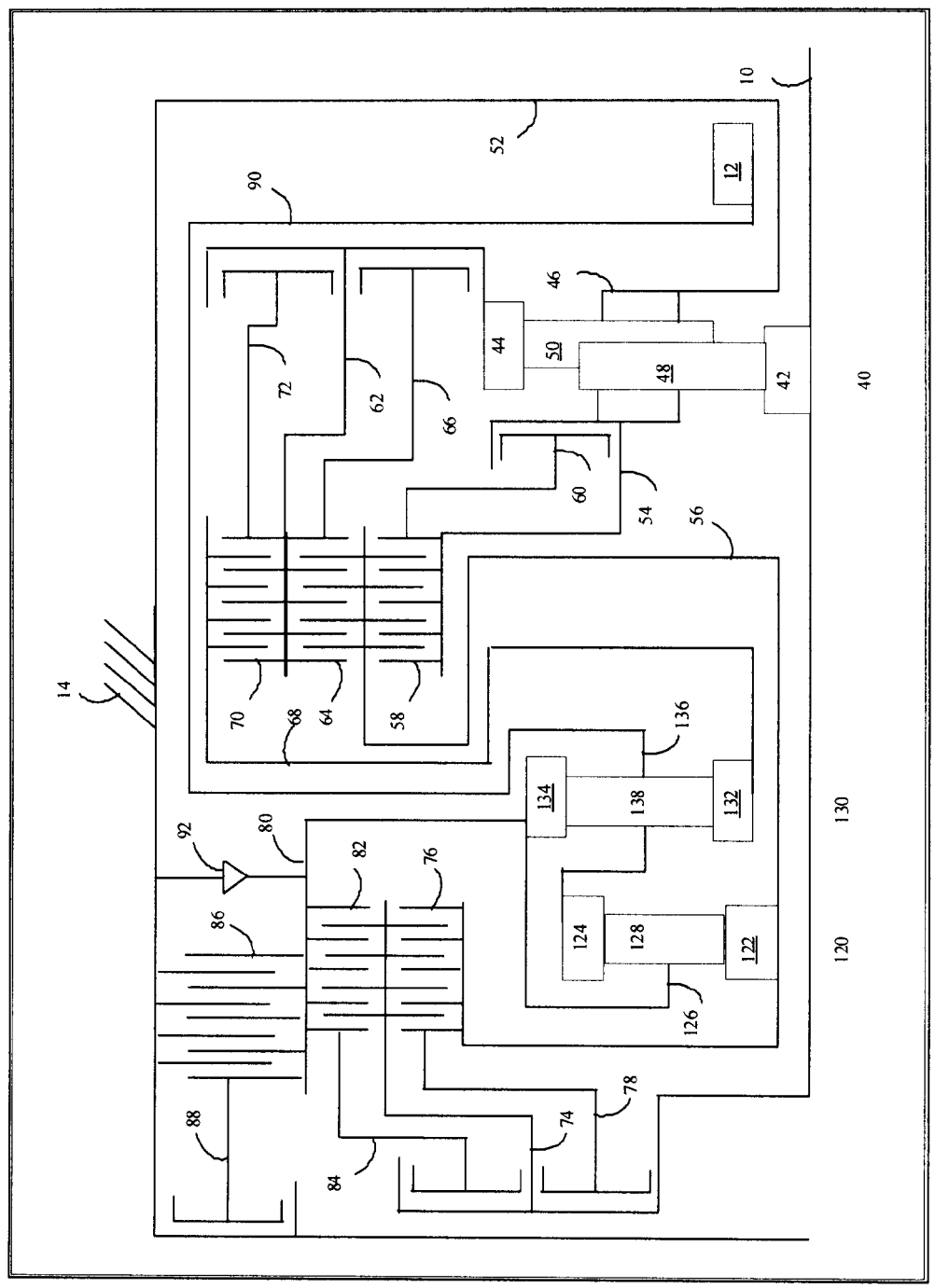
FIG. 4 is a schematic diagram of a transmission according to the present invention wherein the epicyclic gearing assembly is a crossed ring carrier gear set.

FIG. 4 illustrates a transmission according to the present invention in which the epicyclic gearing assembly comprises two simple planetary gear sets 120 and 130 in a crossed ring carrier configuration. Carrier 136 is fixed to ring gear 124 and also to output element 12 through shell 90. Carrier 126 is fixed to ring gear 134 and shell 80. The first member corresponds to sun gear 132 which is fixed to shell 68. The second member corresponds to the combination of carrier 136 and ring gear 124. The third member corresponds to the combination of carrier 126 and ring gear 134. Finally, the fourth member corresponds to sun gear 122 which is fixed to shell 56. FIG. 5 shows suggested tooth numbers for this embodiment and FIG. 6 shows the resulting speed ratios. The operation of this embodiment is identical to the operation of the embodiment of FIG. 1.

Figure 7:
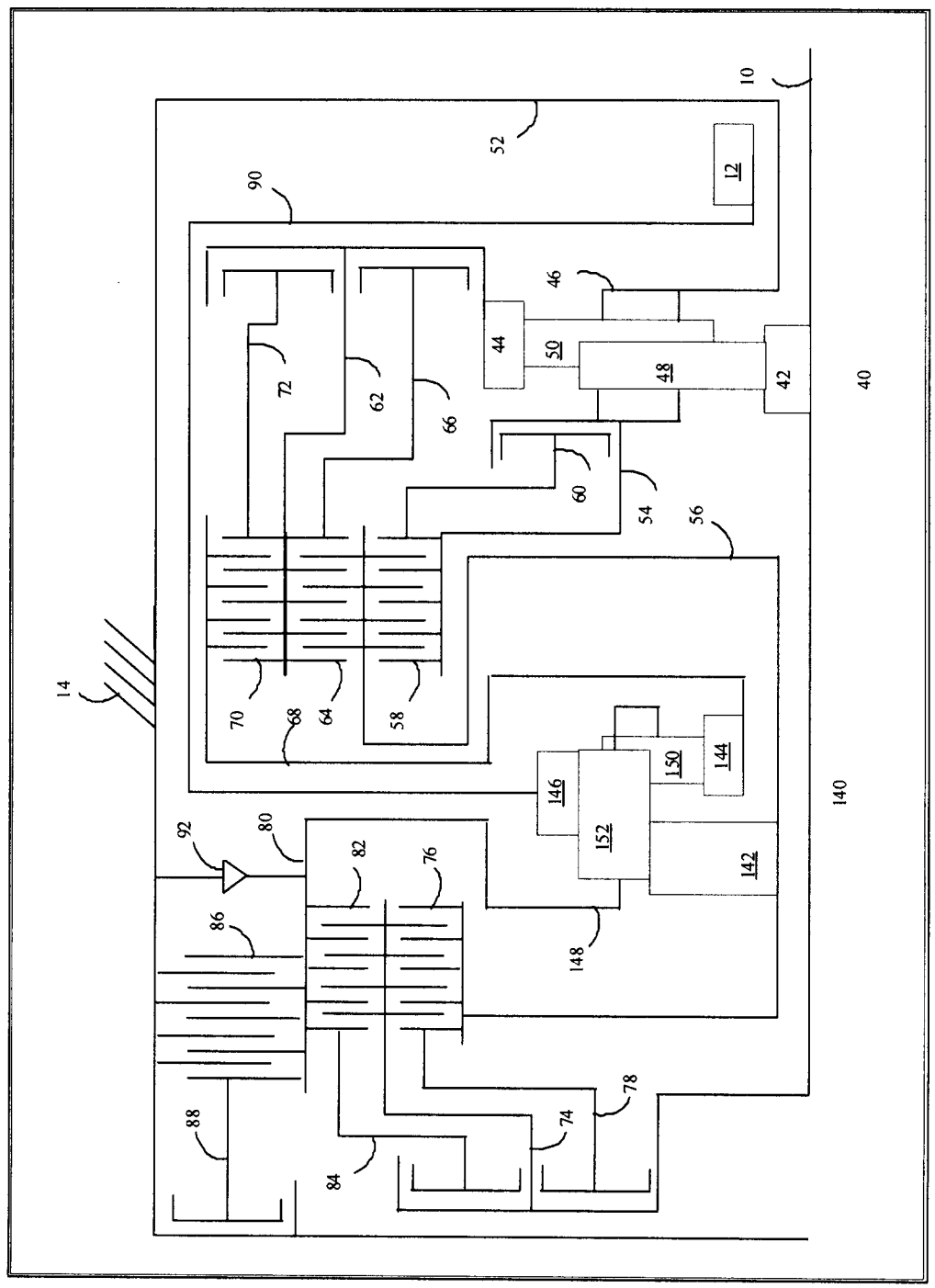
FIG. 7 is a schematic diagram of a transmission according to the present invention wherein the epicyclic gearing assembly is a Ravigneaux gear set.

FIG. 7 illustrates a transmission according to the present invention in which the epicyclic gearing assembly is a Ravigneaux gear set 140. A set of long planet gears 152 is supported for rotation on carrier 148 and meshes with both sun gear 142 and ring gear 146. A set of short planet gears 150 is also supported for rotation on carrier 148 such that each short planet gear meshes with a corresponding long planet gear and with sun gear 144. The first member corresponds to sun gear 144 which is fixed to shell 68. The second member corresponds to ring gear 146 which is fixed to output element 12 through shell 90. The third member corresponds to carrier 148 which is fixed to shell 80. Finally, the fourth member corresponds to sun gear 142 which is fixed to shell 56. FIG. 8 shows suggested tooth numbers for this embodiment and FIG. 9 shows the resulting speed ratios. The operation of this embodiment is identical to the operation of the embodiment of FIG. 1.

Other types of epicyclic gearing assemblies are known and may be substituted without departing from the present invention. These other known types include but are not limited to planetary gear sets with stepped planet gears and other combinations of two simple or double pinion planetary gear sets with two connections between elements.

In accordance with the provisions of the patent statutes, the preferred embodiment has been described. However, it should be noted that alternate embodiments can be practiced otherwise than as specifically illustrated and described.

What is claimed is:

1. A multiple speed power transmission, comprising:
a housing;
an input shaft projecting through an input side of the housing;
an epicyclic gearing assembly comprising first, second, third, and fourth rotating members configured such that the speed of the second rotating member is constrained to be between that of the first and third rotating members and the speed of the third rotating members is constrained to be between that of the second and fourth rotating members;
a first planetary gear set axially located between the epicyclic gearing assembly and the input side of the housing and comprising a first sun gear fixed to the input shaft, a first ring gear, a first carrier fixed to the housing, a first set of planet gears supported on the first carrier and meshing with the first sun gear, and a second set of planet gears supported on the first carrier and meshing with both the first ring gear and the first set of planet gears;
a first brake releasably holding the third rotating member against rotation;
a second brake releasably holding the fourth rotating member against rotation;
a first clutch releasably connecting the third rotating member to the input shaft;
a second clutch releasably connecting the fourth rotating member to the first ring gear;
a third clutch releasably connecting the first rotating member to the first ring gear; and
an output element fixed to the second rotating member and axially located between the first planetary gear set and the input side of the housing.

2. The multiple speed power transmission of claim 1, further comprising a fourth clutch releasably connecting the fourth rotating member to the input shaft.

3. The multiple speed power transmission of claim 2, wherein:
the first brake, first clutch, and fourth clutch are located at substantially the same axial position;
the first clutch is radially located outside the fourth clutch; and
the first clutch is radially located inside the first brake.

4. The multiple speed power transmission of claim 1, wherein:
the second brake, second clutch, and third clutch are located at substantially the same axial position;
the second clutch is radially located outside the second brake; and
the second clutch is radially located inside the third clutch.

5. A multiple speed power transmission, comprising:
a housing;
an input shaft projecting through an input side of the housing;
a first planetary gear set comprising a first sun gear fixed to the input shaft, a first ring gear, a first carrier fixed to the housing, a first set of planet gears supported on the first carrier and meshing with the first sun gear, and a second set of planet gears supported on the first carrier and meshing with both the first ring gear and the first set of planet gears;
a second planetary gear set comprising a second sun gear, a second ring gear, a second carrier, and a third set of planet gears supported on the second carrier and meshing with both the second sun gear and the second ring gear, the first planetary gear set axially located between the second planetary gear set and the input side of the housing;
a third planetary gear set comprising a third sun gear fixed to the second sun gear, a third ring gear fixed to the second carrier, a third carrier, and a fourth set of planet gears supported on the third carrier and meshing with both the third sun gear and the third ring gear;
a first brake releasably holding the third carrier against rotation;
a second brake releasably holding the second sun gear and third sun gear against rotation;
a first clutch releasably connecting the third carrier to the input shaft;
a second clutch releasably connecting the second sun gear and third sun gear to the first ring gear, the second clutch radially located outside the second brake and at substantially the same axial position;
a third clutch releasably connecting the second ring gear to the first ring gear, the third clutch radially located outside the second clutch and at substantially the same axial position; and
an output element fixed to the second carrier and the third ring gear, the output element axially located between the first planetary gear set and the input side of the housing.

6. The multiple speed power transmission of claim 5, further comprising a fourth clutch releasably connecting the second sun gear and third sun gear to the input shaft.

7. The multiple speed power transmission of claim 6, wherein:
the first brake, first clutch, and fourth clutch are located at substantially the same axial position;
the first clutch is radially located outside the fourth clutch; and
the first clutch is radially located inside the first brake.

* * * * *